(12) United States Patent
McConville et al.

(10) Patent No.: US 8,931,444 B2
(45) Date of Patent: Jan. 13, 2015

(54) HEAD PACKAGING FOR CYLINDER DEACTIVATION

(71) Applicant: Ford Global Technologies, LLC, Dearborn, MI (US)

(72) Inventors: Gregory Patrick McConville, Ann Arbor, MI (US); Kim Hwe Ku, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/682,477

(22) Filed: Nov. 20, 2012

(65) Prior Publication Data
US 2014/0137819 A1    May 22, 2014

(51) Int. Cl.
*F01L 1/34*    (2006.01)
*F01L 1/20*    (2006.01)
*F01L 13/00*    (2006.01)
*F02D 13/06*    (2006.01)
*F01L 1/344*    (2006.01)
*F01L 1/053*    (2006.01)
*F02B 75/18*    (2006.01)

(52) U.S. Cl.
CPC ............... *F01L 1/20* (2013.01); *F01L 13/0036* (2013.01); *F02D 13/06* (2013.01); *F01L 1/344* (2013.01); *F01L 13/0005* (2013.01); *F01L 2001/0537* (2013.01); *F01L 2013/0052* (2013.01); *F02B 2075/1816* (2013.01)
USPC ..................................... 123/90.16; 123/90.15

(58) Field of Classification Search
USPC ......................... 123/90.15–90.18, 90.27, 90.6
See application file for complete search history.

(56) References Cited

U.S. PATENT DOCUMENTS

| | | | |
|---|---|---|---|
| 4,615,308 A | 10/1986 | Asanomi et al. | |
| 4,794,893 A * | 1/1989 | Masuda et al. ............. | 123/90.17 |
| 4,848,284 A * | 7/1989 | Konno ........................ | 123/90.16 |
| 5,445,117 A * | 8/1995 | Mendler .................... | 123/90.16 |
| 5,758,612 A * | 6/1998 | Tsuzuku et al. ........... | 123/90.16 |
| 5,836,274 A * | 11/1998 | Saito et al. ................ | 123/90.16 |
| 6,832,583 B2 * | 12/2004 | Hayman .................... | 123/90.16 |
| 6,948,468 B1 * | 9/2005 | Decuir, Jr. ................. | 123/90.24 |
| 7,918,199 B2 | 4/2011 | Hashimoto et al. | |
| 7,980,217 B2 | 7/2011 | Evans et al. | |
| 2002/0017259 A1* | 2/2002 | Tosaka et al. ............. | 123/90.27 |
| 2005/0066932 A1 | 3/2005 | Patterson et al. | |
| 2008/0170816 A1* | 7/2008 | Ueno et al. ................. | 384/418 |
| 2009/0151673 A1* | 6/2009 | Choi .......................... | 123/90.15 |
| 2009/0301086 A1 | 12/2009 | Ralston | |
| 2010/0132641 A1* | 6/2010 | Yokoyama et al. ........ | 123/90.16 |

FOREIGN PATENT DOCUMENTS

DE    3920938 A1    1/1990

* cited by examiner

*Primary Examiner* — Thomas Denion
*Assistant Examiner* — Steven D Shipe
(74) *Attorney, Agent, or Firm* — Greg Brown; Alleman Hall McCoy Russell & Tuttle LLP (57) ABSTRACT

Systems and methods for an overhead cam shaft coupled to an inline engine with inner cylinders and outer cylinders are disclosed. In one example approach, an engine bank comprises inner cylinders each having only first and second lift profiles, both being non-zero lift profiles, and outer cylinders each having first, second, and third lift profiles, two being non-zero lift profiles and one being zero lift.

13 Claims, 5 Drawing Sheets

HEAD PACKAGING FOR CYLINDER DEACTIVATION

BACKGROUND AND SUMMARY

Variable displacement engine (VDE) designs are well known in the art for providing increased fuel efficiency by deactivating cylinders during operation modes requiring decreased engine output. Such designs may also incorporate cam profile switching (CPS) to enable high or low lift valve train modes which correspond to increased fuel efficiency during high and low engine speeds, respectively.

In CPS systems, a VDE design may be supported through a no-lift cam profile that deactivates cylinders based on engine output needs. As an example, U.S. Pat. No. 6,832,583 describes an engine valve train having multiple valve lift modes including cylinder deactivation. The described example utilizes high and low lift cams on the valve train which can be further modified so that low lift corresponds to a zero-lift deactivation setting.

However, the inventors herein have recognized that such an approach does not incorporate three distinct lift profiles for one cylinder. Generally speaking, mechanisms for deactivating valves or enabling a third lift profile require more space along the length of an overhead camshaft. The placement of cam towers and cylinder bore spacing requirements further inhibit the inclusion of multiple valve lift profiles and/or cylinder deactivation mechanisms.

In order to address these issues, systems and methods for an overhead cam shaft coupled to an inline engine with inner cylinders and outer cylinders are provided. In one example approach, an engine bank comprises inner cylinders each having only first and second lift profiles, both being non-zero lift profiles, and outer cylinders each having first, second, and third lift profiles, two being non-zero lift profiles and one being zero lift.

In this way, an engine cylinder head design in which a third, zero-lift profile may be included in some cylinders having both first and second lift profiles. For example, a cylinder head may be enabled with a camshaft having high and low lift cam profiles on all cylinders, and selective deactivation of outer cylinders only by inclusion of a third, zero-life profile on these cylinders. Such an approach utilizes additional space located on the outer camshaft as per some pre-existing engine cylinder head designs and asymmetrical cam tower placement to allow sufficient space for the different cam profiles over both outer and inner cylinders without intruding on inner cylinder spacing. Such an approach has the potential advantage of enabling VDE and CPS concurrently in a more compact engine design such as an inline, four-cylinder engine. Further, such an approach may enable flexibility of using the same engine architecture on multiple vehicle platforms.

While one example shows two lift profiles on inner cylinders and three lift profiles on outer cylinders, the present application recognizes that in another example, outer cylinders may have fewer discrete lift profiles than inner cylinders, where inner cylinders have wider cam tower placement as compared to outer cylinders.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
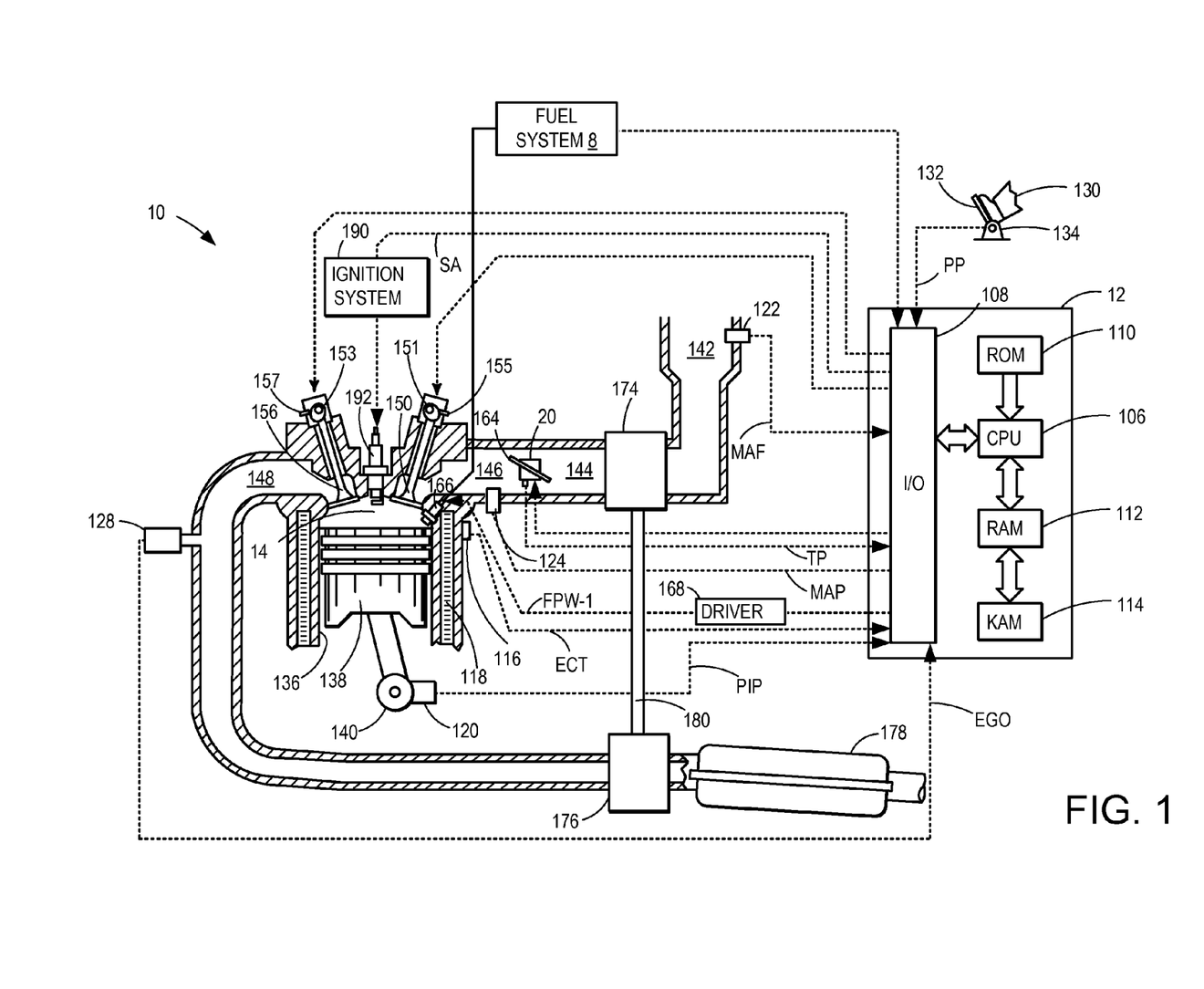
FIG. 1 shows a schematic diagram of one cylinder of an example engine system.
Figure 2:
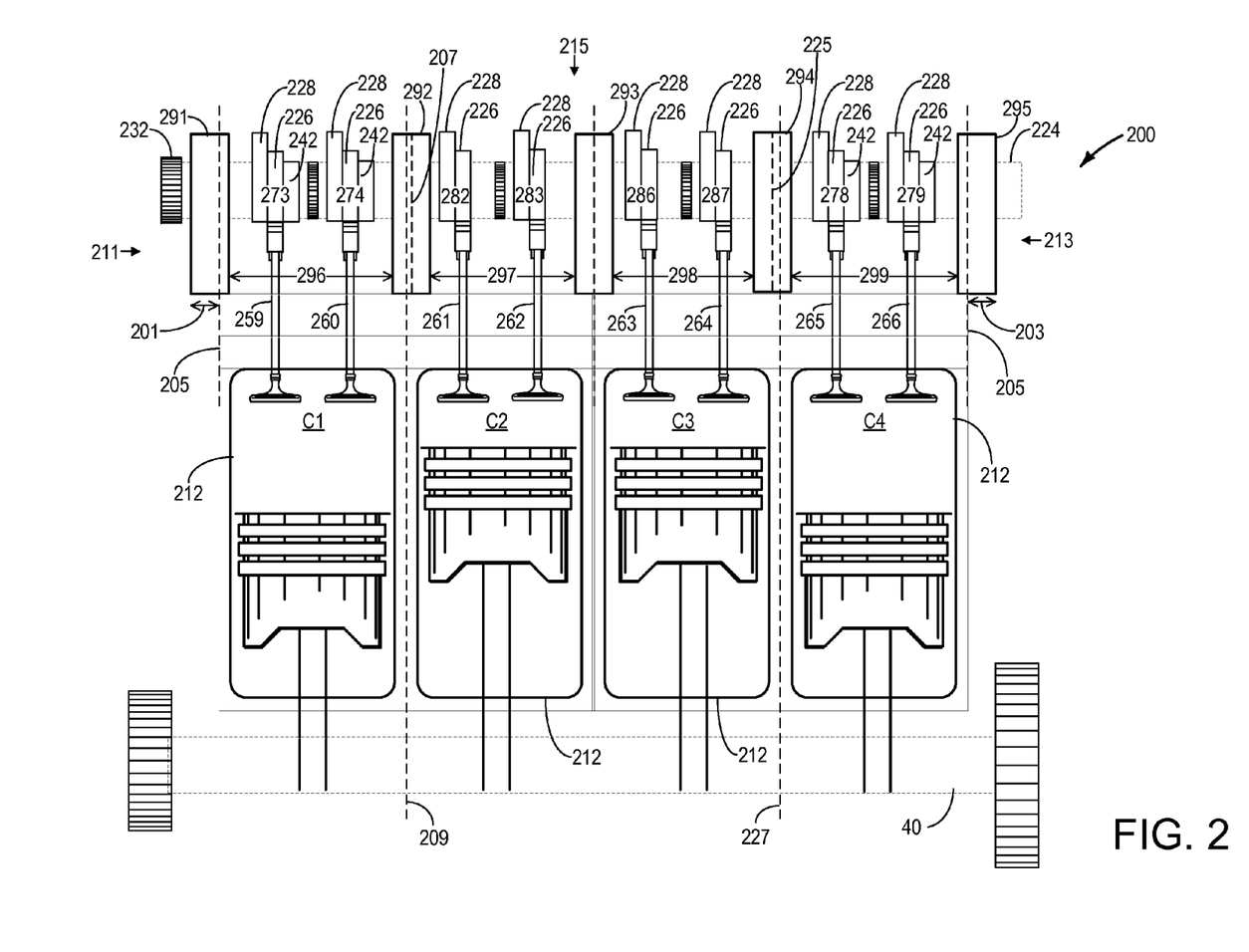
FIGS. 2 and 3 show an example engine bank including a cam profile switching system in accordance with the disclosure.
Figure 3:
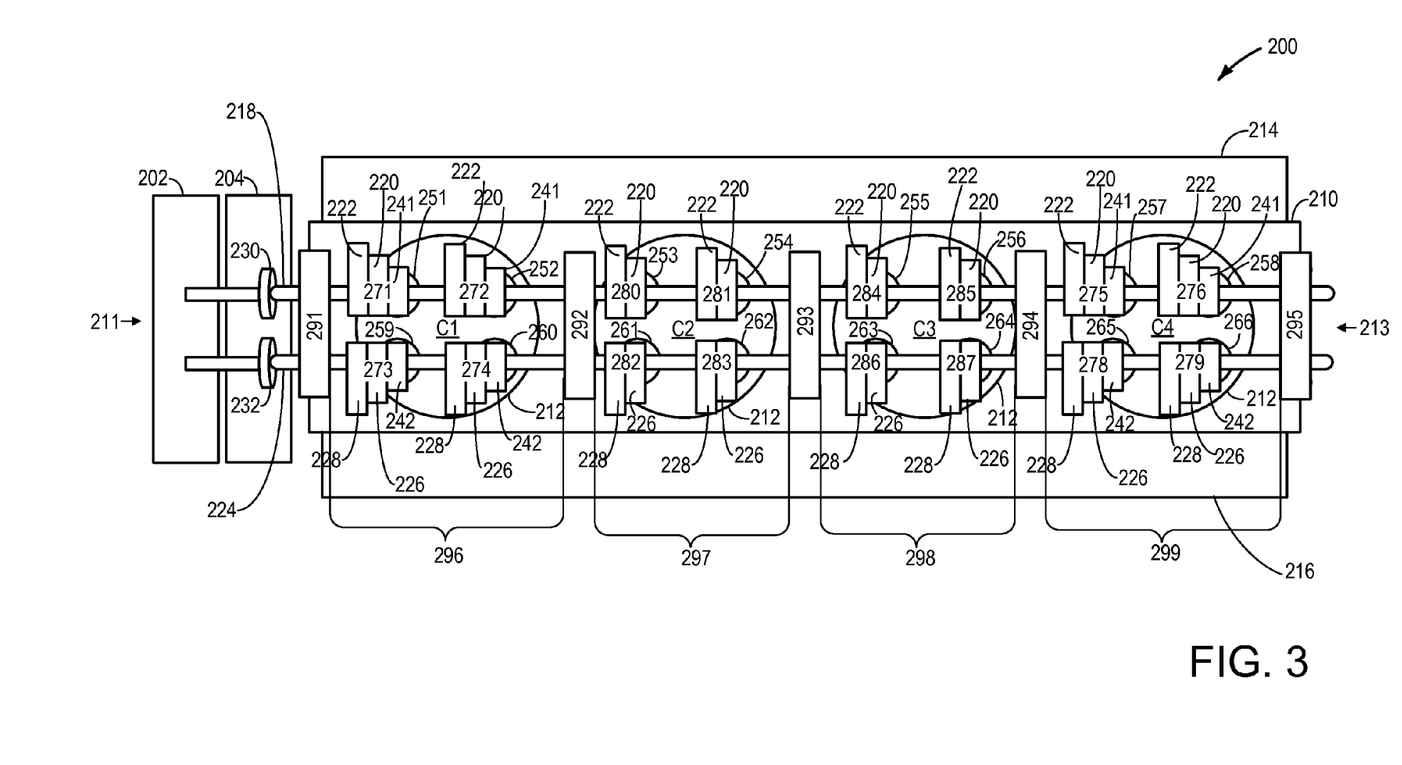
Figure 4:
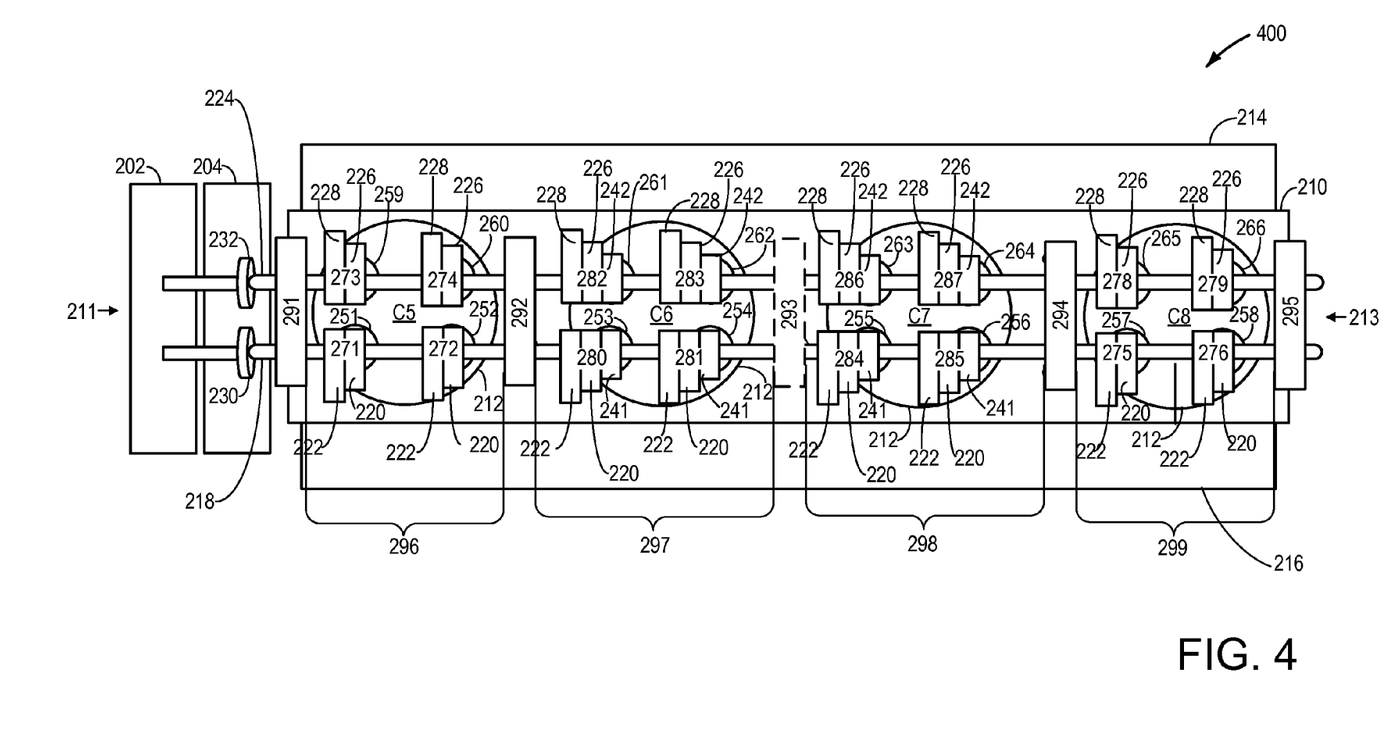
FIG. 4 shows another example engine bank including a cam profile switching system in accordance with the disclosure.

The following description relates to an internal combustion engine, such as the engine shown in FIG. 1, having a cylinder bank and cylinder head enabled with a cam-profile-switching (CPS) system and variable-displacement engine (VDE) modes. As shown in FIGS. 2 and 3, an engine cylinder head may be designed to permit deactivation of valves on outer cylinders using wider mechanisms on the outer cylinders compared to the mechanisms on inner cylinders which do not deactivate. In other examples, as shown in FIG. 4, an engine cylinder head may be designed to permit deactivation of valves on inner cylinders using wider mechanisms on the inner cylinders compared to the mechanisms on outer cylinders which do not deactivate. As described in FIG. 5, such a cylinder head configuration may be used to adjust valve lift profiles on both inner and outer cylinders and to deactivate outer cylinders based on engine operating conditions.

Turning now to the figures, FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber') 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178 although in some embodiments, exhaust gas sensor 128 may be positioned downstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. Example cam actuation systems are described in more detail below with regard to FIGS. 2 and 3.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for delivering fuel. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

It will be appreciated that, in an alternate embodiment, injector 166 may be a port injector providing fuel into the intake port upstream of cylinder 14. Further, while the example embodiment shows fuel injected to the cylinder via a single injector, the engine may alternatively be operated by injecting fuel via multiple injectors, such as one direct injector and one port injector. In such a configuration, the controller may vary a relative amount of injection from each injector.

Fuel may be delivered by the injector to the cylinder during a single cycle of the cylinder. Further, the distribution and/or relative amount of fuel or knock control fluid delivered from the injector may vary with operating conditions, such as air charge temperature, as described herein below. Furthermore, for a single combustion event, multiple injections of the delivered fuel may be performed per cycle. The multiple injections may be performed during the compression stroke, intake stroke, or any appropriate combination thereof. It should be understood that the head packaging configurations and methods described herein may be used in engines with any suitable fuel delivery mechanisms or systems, e.g., in carbureted engines or other engines with other fuel delivery systems.

As described above, FIG. 1 shows only one cylinder of a multi-cylinder engine. As such each cylinder may similarly include its own set of intake/exhaust valves, fuel injector(s), spark plug, etc.

FIGS. 2 and 3 show an example engine bank 200, e.g., an engine bank of engine 10 described above, from a side view in FIG. 2 and a top view in FIG. 3. Engine bank 200 includes a plurality of cylinders configured to operating in different valve lift modes, e.g., a high valve lift, low valve lift, and zero valve lift. For example, as described in more detail below, by adjusting cylinder cam mechanisms, the valves on one or more cylinders may be operated in different lift modes based on engine operating conditions.

As shown in FIGS. 2 and 3, engine bank 200 may include a variable cam timing (VCT) system 202, a cam profile switching (CPS) system 204, and a cylinder head 210 with a plurality of cylinders 212. Engine 200 may be one example of engine 10 described above. Engine bank 200 is shown having an intake manifold 214 configured to supply intake air and/or fuel to the cylinders 212 and an exhaust manifold 216 configured to exhaust the combustion products from the cylinders 212. Exhaust manifold 216 may include a plurality of outlets, each coupled to different exhaust components. In some examples, intake manifold 214 and exhaust manifold 216 may be integrated into cylinder head 210. However, in other examples one or both of the intake and exhaust manifolds may be at least partially separated from cylinder head 210.

In the example shown in FIGS. 2 and 3, cylinder head 210 includes four cylinders, labeled C1, C2, C3, and C4, arranged in an inline configuration. However, it should be understood that any number of cylinders and a variety of different cylinder configurations may be used, e.g., V-6, I-4, I-6, V-12, opposed 4, and other engine types. In FIGS. 2 and 3, cylinder C1 is position at a first end 211, e.g., a front end, of engine bank 200 and cylinder C4 is positioned at a second end 213 opposing first end 211, e.g., at a back end of cylinder bank 200. Cylinders C2 and C3 are positioned between cylinders C1 and C4 with cylinder C2 adjacent to cylinder C1 and cylinder C3 adjacent to cylinder C4.

Cylinders 212 may each include a spark plug and a fuel injector for delivering fuel directly to the combustion chamber, as described above in FIG. 1. However, in alternate embodiments, each cylinder may not include a spark plug and/or direct fuel injector. Cylinders may each be serviced by one or more gas exchange valves. In the present example, cylinders 212 each include two intake valves and two exhaust valves. Each intake and exhaust valve is configured to open and close an intake port and exhaust port, respectively. For example, cylinder C1 includes intake valves 251 and 252 and exhaust valves 259 and 260, cylinder C2 includes intake valves 253 and 254 and exhaust valves 261 and 262, cylinder C3 includes intake valves 255 and 256 and exhaust valves 263 and 264, and cylinder C4 includes intake valve 257 and 258 and exhaust valves 265 and 266.

Each intake valve is actuatable between an open position allowing intake air into a respective cylinder and a closed position substantially blocking intake air from the respective cylinder via an intake camshaft 218. Intake camshaft 218 is positioned in an overhead position above cylinders 212 adjacent to a top portion 215 of engine bank 200.

Intake camshaft 218 includes a plurality of intake cams configured to control the opening and closing of the intake valves. In the present example, intake camshaft 218 includes low lift intake cams 220 having a first cam lobe profile for opening the intake valves for a first intake duration. Furthermore, intake camshaft 218 includes high lift intake cams 222 having a second cam lobe profile, larger than the first cam lobe profile, for opening the intake valve for a second intake duration. Since the second lob profile is larger than the first lobe profile, the second intake duration may be longer than the first intake duration.

Likewise, each exhaust valve is actuatable between an open position allowing exhaust gas out of a respective cylinder of the cylinders 212 and a closed position substantially retaining gas within the respective cylinder via an overhead exhaust camshaft 224. Exhaust camshaft 224 is also positioned in an overhead position above cylinders 212 adjacent to the top portion 215 of engine bank 200. Exhaust camshaft 224 includes a plurality of exhaust cams configured to control the opening and closing of the exhaust valves. As with the intake valvetrain, each exhaust valve may be controlled by first exhaust cams 226 and second exhaust cams 228. In the present example, first exhaust cams 226 have a first cam lobe profile for opening the exhaust valves for a first exhaust duration. Further, in the present example, second exhaust cams 228 have a second cam lobe profile, larger than the first cam lobe profile, for opening the exhaust valve for a second exhaust duration. Since the second cam lobe profile of cams 228 is larger than the first cam lobe profile of cams 226, the second exhaust duration may be longer than the first exhaust duration.

Further, in order to permit deactivation of select intake and exhaust valves of an internal combustion engine, e.g., for the purpose of saving fuel, select cylinders may additionally include null or zero lift cam lobes. For example, as shown in the example engine bank 200, outer cylinders C1 and C4 include zero lift intake cams 241 and zero lift exhaust cams 242. In particular, intake camshaft 218 includes zero lift intake cams 241 positioned above intake valves on cylinders C1 and C4 and exhaust camshaft 224 includes zero lift exhaust cams 242 positioned above exhaust valves on cylinders C1 and C4. The zero lift exhaust cams 241 and 242 may have a smaller profile than the high lift cams 222 and 288 and the low lift cams 220 and 226 and may be configured to deactivate outer cylinders C1 and C4 based on operating conditions as described below. In the example shown in FIGS. 2 and 3, the inner cylinders C2 and C3 do not include any null cams so that cylinders C2 and C3 cannot be deactivated.

Thus, each valve in each cylinder includes a mechanism coupled to the camshaft above the valve for adjusting an amount of valve lift for that valve and/or for deactivating that valve. For example, outer cylinder C1 includes mechanisms 271 and 272 coupled to camshaft 218 above intake valves 251 and 252, respectively, and mechanisms 273 and 274 coupled to camshaft 224 above exhaust valves 259 and 260, respectively. Each of the mechanisms 271, 272, 273, and 274 for cylinder C1 includes three different lift profile cams, a high lift cam, a low lift cam, and a zero lift cam. Likewise, outer cylinder C4 includes mechanisms 275 and 276 coupled to camshaft 218 above intake valves 257 and 258, respectively, and mechanisms 278 and 279 coupled to camshaft 224 above exhaust valves 265 and 266, respectively. Each of the mechanisms 275, 276, 277, and 278 for cylinder C4 includes three different lift profile cams, a high lift cam, a low lift cam, and a zero lift cam.

However, inner cylinders C2 and C3 only include two different lift profile cams above the valves. For example, inner cylinder C2 includes mechanisms 280 and 281 coupled to camshaft 218 above intake valves 253 and 254, respectively, and mechanisms 282 and 283 coupled to camshaft 224 above exhaust valves 261 and 262, respectively. Each of the mechanisms 280, 281, 282, and 283 for cylinder C2 includes two different lift profile cams, a high lift cam and a low lift cam. Likewise, inner cylinder C3 includes mechanisms 284 and 285 coupled to camshaft 218 above intake valves 255 and 256, respectively, and mechanisms 286 and 287 coupled to camshaft 224 above exhaust valves 263 and 264, respectively. Each of the mechanisms 284, 285, 286, and 287 for cylinder C3 includes two different lift profile cams, a high lift cam and a low lift cam.

The cam mechanisms may be positioned directly above a corresponding valve in a cylinder. Further, the cam lobes may be slideably attached to the cam shaft so that they can slide along the camshaft on a per-cylinder basis. For example, FIG. 2 shows an example where the low cam lobes, 226, are positioned above each valve in the cylinder. The sets of cam lobes positioned above each cylinder valve may be slid across the camshaft to change a lobe profile coupled to the valve follower mechanisms to change the valve opening and closing durations. For example, The lift mechanism 273 positioned above valve 259 may be shifted toward end 213 to move cam lobe 228 with a high lift profile to a position above the valve 259 so that the lift profile associated with cam 228 is used to control the opening and closing of valve 259. As another example, lift mechanism 273 positioned above valve 259 may be shifted toward end 211 to move cam lobe 242 with a zero lift profile above the valve 259 so that the zero lift associated with cam 242 is used to deactivate valve 259.

Further, in some examples, lift mechanisms above outer cylinders, such as mechanisms 273, 274, 378, and 279, may include only two profiles, e.g., an active non-zero lift profile and a zero lift profile, whereas lift mechanisms above inner cylinders, such as mechanisms 282, 283, 286, and 287, may include only one non-zero lift profile.

Cam towers, e.g., cam towers 291, 292, 293, 294, and 295 shown in FIGS. 2 and 3, may be coupled to cylinder head 210 adjacent to top portion 215 of engine bank 200. However, though FIGS. 2 and 3 show cam towers coupled to the cylinder head, in other examples, the cam towers may be coupled to other components of an engine block, e.g., to a camshaft carrier or the cam cover. The cam towers may support overhead camshafts and may separate the lift mechanisms positioned on the camshafts above each cylinder. For example, the lift mechanisms 271, 272, 273, and 274 above cylinder C1 are flanked by cam tower 291 adjacent to first end 211 and cam tower 292. The lift mechanisms 280, 281, 282, and 283 above cylinder C2 are flanked by cam tower 292 and cam tower 293. The lift mechanisms 284, 285, 286, and 287 above cylinder C3 are flanked by cam towers 293 and 294. The lift mechanisms 275, 276, 278, and 279 above cylinder C4 are flanked by cam tower 294 and cam tower 295, where cam tower 295 is adjacent to second end 213 of engine bank 200. The distance 296 between inner walls of cam towers 291 and 292 above cylinder C1 is greater than the distances 297 and 298 between inner walls of the cam towers above inner cylinders C2 and C3 to provide additional spacing above cylinder C1 for the inclusion of the additional zero lift cams 241 and 242 above cylinder C1. Likewise, distance 299 between inner walls of cam towers 294 and 295 above cylinder C4 is greater than the distances 297 and 298 between inner walls of the cam towers above inner cylinders C2 and C3 to provide additional spacing above cylinder C4 for the inclusion of the additional zero lift cams 241 and 242 above cylinder C4. Since, in this example, the outer cylinders C1 and C4 include deactivation mechanisms, the external cam towers at opposing ends of engine bank 200 may be positioned to extend at least partially beyond the edges of engine bank 200 at the opposing ends 211 and 213. For example, cam tower 291 at first end 211 may extend a distance 201 beyond an outer wall 205 of cylinder head 210 in a direction towards first end 211 and cam tower 295 at second opposing end 213 may extend a distance 203 beyond an outer wall 205 of cylinder head 210 in a direction towards second end 213. In this way, additional space between cam towers flanking outer cylinders may be provided to accommodate the addition deactivation cams.

Further, cam towers flanking both an inner and outer cylinder may be positioned to provide additional space between cam towers flanking the outer cylinders. For example, a center of a cam tower flanking both an outer cylinder and an inner cylinder may be offset from a midpoint between the inner and outer cylinder in a direction toward the inner cylinder. For example, cam tower 292 flanks both outer cylinder C1 and inner cylinder C2, thus a center line 207 of cam tower 292 may be offset from a center line or midpoint 209 between cylinder C1 and C2 in a direction from first end 211 towards second end 213. Likewise, since cam tower 294 flanks both outer cylinder C4 and inner cylinder C3, a center line 225 of cam tower 294 may be offset from a center line or midpoint 227 between cylinders C3 and C4 in a direction from second end 211 toward first end 213. This increased distance between cam towers flanking the outer cylinders provides space to accommodate the additional cam features above the outer cylinders while still maintaining sufficient space for the cam features positioned above the inner cylinders.

In some examples, in order to provide additional space above outer cylinders C1 and C4 shown in FIG. 3, a widths of cam towers 292 and 294 may be reduced so that that they are less than a width of the other cam towers. As another example, cam towers 292 and 294 may not be included so that no cam tower is present, i.e. no cam support bearing is included, between cylinders C1 and C1 and between cylinders C3 and C4 in order to provide additional spacing for the lift mechanisms above the outer cylinders.

Additional elements not shown in FIGS. 2 and 3 may further include push rods, rocker arms, tappets, etc. Such devices and features may control actuation of the intake valves and the exhaust valves by converting rotational motion of the cams into translational motion of the valves. In other examples, the valves can be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 212 may each have only one exhaust valve and/or intake valve, or more than two intake and/or exhaust valves. In still other examples, exhaust valves and intake valves may be actuated by a common camshaft. However, in an alternate embodiment, at least one of the intake valves and/or exhaust valves may be actuated by its own independent camshaft or other device.

As remarked above, engine bank 200 may include variable valve actuation systems, for example CPS system 204, and variable cam timing VCT system 202. A variable valve actuation system may be configured to operate in multiple operating modes. The first operating mode may occur following a cold engine start, for example when engine temperature is below a threshold or for a given duration following an engine start. During the first mode, the variable valve actuation system may be configured to open only a subset of exhaust ports of a subset of cylinders, with all other exhaust ports closed. For example, only exhaust valves 262 and 264 of cylinders C2 and C3 may be opened. A second operating mode may occur during standard, warmed up engine operation. During the second mode, the variable valve actuation system may be configured to open all exhaust ports of all cylinders. Further, during the second mode, the variable valve actuation system may be configured to open the subset of exhaust ports of the subset of cylinders for a shorter duration than the remaining exhaust ports. A third operating mode may occur during warmed up engine operation with low engine speed and high load. During the third mode, the variable valve actuation system may be configured to keep the subset of exhaust ports of the subset of cylinders closed while opening the remaining exhaust ports, e.g., opposite of the first mode. Additionally, the variable valve actuation system may be configured to selectively open and close the intake ports in correspondence to the opening and closing of the exhaust ports during the various operating modes.

In some examples, CPS system 204 may be configured to translate specific portions of intake camshaft 218 longitudinally, thereby causing operation of intake valves to vary between first intake cams 220 and second intake cams 222 and/or other intake cams. Further, CPS system 204 may be configured to translate specific portions of exhaust camshaft 224 longitudinally, thereby causing operation of exhaust valves to vary between first exhaust cams 226 and second exhaust cams 228 and/or other exhaust cams. In this way, CPS system 204 may switch between multiple profiles. For example, during the first operating mode discussed above, the CPS system 204 may be switched to a first profile. Further, the CPS system 204 may be switched to a second profile during the second mode, and switched to a third profile during the third mode. In doing so, the CPS system 204 may switch between a first cam, for opening a valve for a first duration, a second cam, for opening the valve for a second duration, and a third cam for deactivating outer cylinders in VDE mode. CPS system 204 may be controlled via signal lines by controller 12, with controller 12 being one non-limiting example of controller 12 of FIG. 1.

The configuration of cams described above may be used to provide control of the amount and timing of air supplied to, and exhausted from, the cylinders 212. However, other configurations may be used to enable CPS system 204 to switch valve control between two or more cams. For example, a switchable tappet or rocker arm may be used for varying valve control between two or more cams.

In some examples, VCT system 202 may be a twin independent variable camshaft timing system, for changing intake valve timing and exhaust valve timing independently of each other. Thus, VCT system 202 may include an intake camshaft phaser 230 and exhaust camshaft phaser 232 for changing valve timing. VCT system 202 may be configured to advance or retard valve timing by advancing or retarding cam timing and may be controlled via signal lines by controller 12. VCT system 202 may be configured to vary the timing of valve opening and closing events by varying the relationship between the crankshaft position and the camshaft position. For example, VCT system 202 may be configured to rotate intake camshaft 218 and/or exhaust camshaft 224 independently of the crankshaft to cause the valve timing to be advanced or retarded. In some embodiments, VCT system 202 may be a cam torque actuated device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be hydraulically powered, or electrically actuated, or combinations thereof. Signal lines can send control signals to and receive a cam timing and/or cam selection measurement from CPS system 204 and VCT system 202.

As described above, FIGS. 1-3 show non-limiting examples of an internal combustion engine and associated intake and exhaust systems. It should be understood that in some embodiments, the engine may have more or less combustion cylinders, control valves, throttles, and compression devices, among others. Example engines may have cylinders arranged in two banks of a "V" configuration. Further, a first camshaft may control the intake valves for a first group or bank of cylinders and a second camshaft may control the intake valves for a second group of cylinders. In this manner, a single CPS system and/or VCT system may be used to control valve operation of a group of cylinders, or separate CPS and/or VCT systems may be used.

As noted herein, in one example of a compression or auto-ignition capable engine, the intake valve(s) may be actuated either by a high or low lift cam profile depending on the selected combustion mode. The low lift cam profile may be used to trap a high level of residual (exhaust) gas in the cylinder. The trapped gasses promote compression or auto-ignition by increasing the initial charge temperature, in some examples. However, in a spark ignition mode (either high or low loads) the high lift cam profile may be used. Such a switchable cam profile may be achieved through various cam and tappet systems. The switching may be achieved in any suitable manner, e.g., through oil flow hydraulic actuators or using electric actuators. As another example, such systems may involve an increased number of tappets.

In another embodiment, rather than using a cylinder with a single intake valve (or multiple switchable intake valves) that changes between different profiles, a cylinder with at least two intake valves, where each of the valves has a different lift profile (at least for that cylinder), may be used. During compression or auto-ignition, a higher and/or longer lift intake valve can be disabled through the use of a collapsible tappet, while a lower and/or shorter lift intake valve remains active. During spark ignition, the higher/longer lift intake valve can operate to increase the airflow into the engine, while the lower/shorter lift continues to operate. In other words, the first intake valve can have a lower lift profile, capable on its own of flowing sufficient air to operate the engine in compression or auto-ignition. Further, the first intake valve can have a valve timing (fixed or adjustable) set for compression or auto-ignition. The second intake valve can have a valve lift and/or timing (fixed or adjustable) that provide a balance of air for spark-ignition, over and above the air required for compression or auto-ignition.

Active valve operation may refer to a valve opening and closing during a cycle of the cylinder, where deactivated valves may be held in a closed position for a cycle of the cylinder (or held in a fixed position for the cycle). It will be appreciated that the above configurations are examples and the approaches discussed herein may be applied to a variety of different variable valve lift profile systems and configurations, such as to exhaust systems, as well as systems that have more than two intake or two exhaust valves per cylinder.

FIG. 4 shows another example engine bank 400. For example, engine bank 400 may be one bank of a V-8 engine. For example, one bank of a V-8 engine may be engine bank 200 described above whereas the other bank of the engine may be engine bank 400. Engine bank 400 is shown from a top view in FIG. 4. Further, like numbers in FIG. 4 correspond to like elements in FIGS. 2 and 3 described above.

In the example shown in FIG. 4, cylinder head 210 includes four cylinders, labeled C5, C6, C7, and C8, arranged in an inline configuration. In FIG. 4, cylinder C5 is position at a first end 211, e.g., a front end, of engine bank 400 and cylinder C8 is positioned at a second end 213 opposing first end 211, e.g., at a back end of cylinder bank 400. Cylinders C6 and C7 are positioned between cylinders C5 and C8 with cylinder C6 adjacent to cylinder C5 and cylinder C7 adjacent to cylinder C8.

Cylinder C5 includes intake valves 251 and 252 and exhaust valves 259 and 260, cylinder C6 includes intake valves 253 and 254 and exhaust valves 261 and 262, cylinder C7 includes intake valves 255 and 256 and exhaust valves 263 and 264, and cylinder C8 includes intake valve 257 and 258 and exhaust valves 265 and 266. In the example engine bank 400, inner cylinders C6 and C7 include zero lift intake cams 241 and zero lift exhaust cams 242. In particular, intake camshaft 218 includes zero lift intake cams 241 positioned above intake valves on cylinders C6 and C7 and exhaust camshaft 224 includes zero lift exhaust cams 242 positioned above exhaust valves on cylinders C6 and C7. In the example shown in FIG. 4, the outer cylinders C5 and C8 do not include any null cams so that cylinders C5 and C8 cannot be deactivated.

Thus, each valve in each cylinder includes a mechanism coupled to the camshaft above the valve for adjusting an amount of valve lift for that valve and/or for deactivating that valve. For example, outer cylinder C5 includes mechanisms 271 and 272 coupled to camshaft 218 above intake valves 251 and 252, respectively, and mechanisms 273 and 274 coupled to camshaft 224 above exhaust valves 259 and 260, respectively. Each of the mechanisms 271, 272, 273, and 274 for cylinder C5 includes only two different lift profile cams, a high lift cam and a low lift cam. Likewise, outer cylinder C8 includes mechanisms 275 and 276 coupled to camshaft 218 above intake valves 257 and 258, respectively, and mechanisms 278 and 279 coupled to camshaft 224 above exhaust valves 265 and 266, respectively. Each of the mechanisms 275, 276, 277, and 278 for cylinder C8 includes only two different lift profile cams, a high lift cam and a low lift cam.

However, inner cylinders C6 and C7 in the example shown in FIG. 4 include three different lift profile cams above the valves. For example, inner cylinder C5 includes mechanisms 280 and 281 coupled to camshaft 218 above intake valves 253 and 254, respectively, and mechanisms 282 and 283 coupled to camshaft 224 above exhaust valves 261 and 262, respectively. Each of the mechanisms 280, 281, 282, and 283 for cylinder C5 includes three different lift profile cams, a high lift cam, a low lift cam, and a zero lift cam. Likewise, inner cylinder C7 includes mechanisms 284 and 285 coupled to camshaft 218 above intake valves 255 and 256, respectively, and mechanisms 286 and 287 coupled to camshaft 224 above exhaust valves 263 and 264, respectively. Each of the mechanisms 284, 285, 286, and 287 for cylinder C7 includes three different lift profile cams, a high lift cam, a low lift cam, and a zero lift cam. Further, in some examples, in this example, lift mechanisms above outer cylinders, such as mechanisms 273, 274, 378, and 279, may include only non-zero lift profile whereas lift mechanisms above inner cylinders, such as mechanisms 282, 283, 286, and 287, may include only two lift profiles, e.g., an active non-zero lift profile and a zero lift profile.

Cam towers, e.g., cam towers 291, 292, 293, 294, and 295 shown in FIG. 4, may be coupled to cylinder head 210 adjacent to top portion 215 of engine bank 400. For example, the lift mechanisms 271, 272, 273, and 274 above cylinder C5 are flanked by cam tower 291 adjacent to first end 211 and cam tower 292. The lift mechanisms 280, 281, 282, and 283 above cylinder C6 are flanked by cam tower 292 and cam tower 293. The lift mechanisms 284, 285, 286, and 287 above cylinder C7 are flanked by cam towers 293 and 294. The lift mechanisms 275, 276, 278, and 279 above cylinder C8 are flanked by cam tower 294 and cam tower 295, where cam tower 295 is adjacent to second end 213 of engine bank 200. In this example, the distance 297 between inner walls of cam towers 292 and 293 above inner cylinder C6 is greater than the distances 296 and 299 between inner walls of the cam towers above outer cylinders C5 and C8 to provide additional spacing above cylinder C6 for the inclusion of the additional zero lift cams 241 and 242 above cylinder C6. Likewise, distance 298 between inner walls of cam towers 293 and 294 above cylinder C7 is greater than the distances 296 and 299 between inner walls of the cam towers above outer cylinders C5 and C8 to provide additional spacing above cylinder C7 for the inclusion of the additional zero lift cams 241 and 242 above cylinder C7.

The external cam towers, 291 and 295, at opposing ends of engine bank 200 may be positioned to extend at least partially beyond the edges of engine bank 200 at the opposing ends 211 and 213 so that cam towers 292 and 294 may be extended outward to provide additional space between the cam towers above the inner cylinders for deactivation elements.

In some examples, in order to provide additional space above inner cylinders C6 and C7 shown in FIG. 4, a width of central cam tower 293 may be reduced so that it is less than a width of the other cam towers. As another example, central cam tower 293 may not be included so that no cam tower is present, i.e. no cam support bearing is included, between inner cylinders C6 and C7 in order to provide additional spacing for the lift mechanisms. Further, the example shown in FIG. 4 may be applied to engines with other numbers of cylinders. For example, an engine with a bank including three cylinders including a single inner cylinder C3 flanked by two outer cylinders C1 and C3. In this example, an inner cam tower between cylinders C1 and C2 or C2 and C3 may be reduced in size or may be eliminated to provide more space for lift mechanisms.

Figure 5:
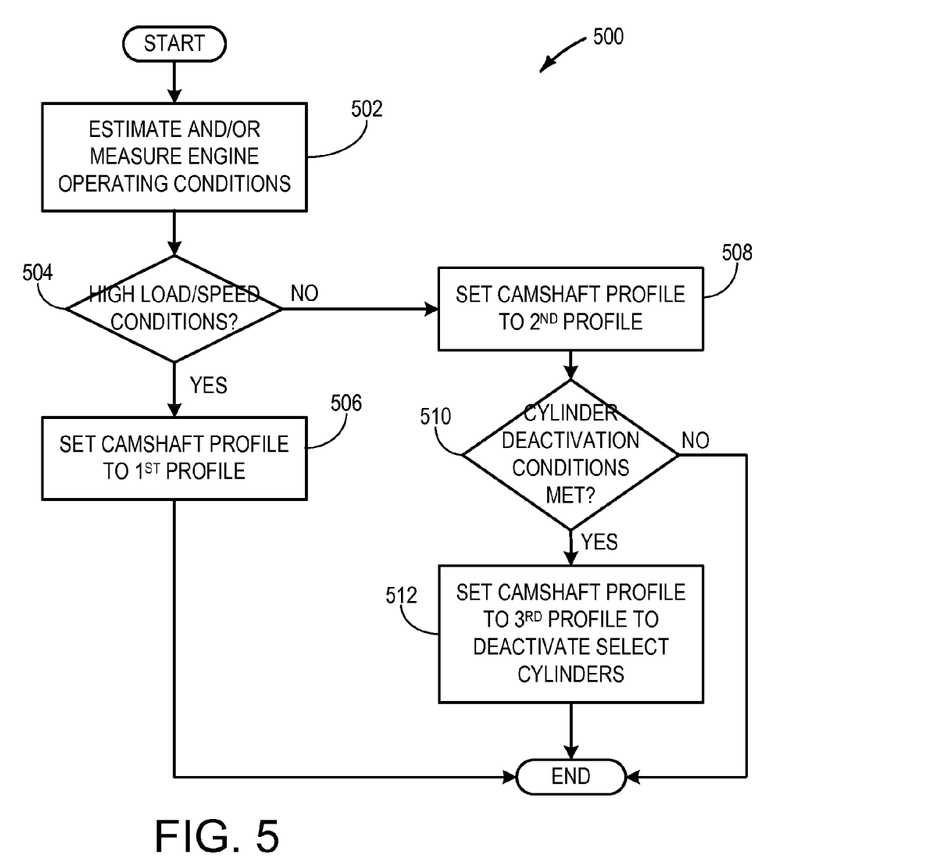
FIG. 5 shows an example method for operating a cam profile switching system in accordance with the disclosure.

FIG. 5 shows an example method 500 for operating a cam profile switching system coupled to an engine bank, e.g., the engine banks shown in FIGS. 2-4. In particular, method 500 describes selectively deactivating outer cylinders, e.g., cylinders C1 and C4, during certain engine operating conditions using the example engine bank shown in FIGS. 2-3, or to selectively deactivate inner cylinders, e.g., cylinders C6 and C7, based on engine operating conditions using the example engine bank shown in FIG. 4.

At 502, method 500 includes estimating and/or measuring engine operating conditions. These may include, for example, engine speed, desired torque (for example, from a pedal-position sensor), manifold pressure (MAP), manifold air flow (MAF), BP, engine temperature, catalyst temperature, intake temperature, spark timing, boost level, air temperature, knock limits, etc.

At 504, method 500 includes determining if high load or high speed engine operating conditions are present. For example, in response to an increased torque request, a high load condition may be confirmed. As another example, in response to an engine speed above a threshold speed, a high speed condition may be confirmed.

If high load and/or high speed conditions are confirmed at 504, method 500 proceeds to 506. At 506, method 500 includes setting a camshaft profile to a first profile. For example, the camshaft profile may be set to a high lift mode to increase a lift duration of cylinder valves. For example, valve lift mechanisms above cylinders 212 shown in FIGS. 2-4 may all be set to lift profiles 222 and 228 for high valve lift operation.

However, if at 504 high load and/or speed conditions are not present then low load/and or low speed conditions may be present and method 500 proceeds to 508. At 508, method 500 includes setting a camshaft profile to a second profile. For example, the cam shaft profile may be set to a low lift profile mode in response to an engine load and/or speed below a threshold. For example, valve lift mechanisms above cylinders 212 shown in FIGS. 2-4 may all be set to lift profiles 220 and 226 for low valve lift operation.

At 510, method 500 includes determining if cylinder deactivation conditions are met. For example, based on the estimated operating conditions, the routine may determine an engine mode of operation (e.g., VDE or non-VDE). As one example, cylinder deactivation conditions may be confirmed when torque demand is less than a threshold. As such, if cylinder deactivation conditions are not met at 510, the routine may end with the engine operating with all cylinders firing.

However, if cylinder deactivation conditions are met at 510, method 500 proceed to 512 to set a camshaft profile to a third profile to deactivate select cylinders while not deactivating other cylinders. For example, in the engine bank shown in FIGS. 2-3, the outer cylinders may be deactivated while the inner cylinders may not be deactivated. For example, valves on outer cylinders C1 and C4 shown in FIGS. 2 and 3 may be set to zero lift profiles 241 and 242 to deactivate all valves on outer cylinders C1 and C4 while maintaining the use of non-zero lift profiles on inner cylinders C2 and C3. For example, valve lift mechanisms above inner cylinders C2 and C3 may be maintained in an active state using lift profiles 220 and 226 for low valve lift operation. As another example, with reference to the engine bank shown in FIG. 4, the inner cylinders may be deactivated while the outer cylinders may not be deactivated. For example, valves on inner cylinders C6 and C7 shown in FIG. 4 may be set to zero lift profiles 241 and 242 to deactivate all valves on inner cylinders C6 and C7 while maintaining the use of non-zero lift profiles on outer cylinders C5 and C8. For example, valve lift mechanisms above outer cylinders C5 and C8 may be maintained in an active state using lift profiles 220 and 226 for low valve lift operation.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine bank, comprising:
inner and outer cylinders;
an intake camshaft and an exhaust camshaft, the intake camshaft including exactly two cams positioned above each intake valve of each inner cylinder and exactly three cams positioned above each intake valve of each outer cylinder, the exhaust camshaft including exactly two cams positioned above each exhaust valve of each inner cylinder and exactly three cams positioned above each exhaust valve of each outer cylinder, the exactly two cams positioned above each intake and exhaust valve of each inner cylinder including first and second cams having non-zero lift profiles, and the exactly three cams positioned above each intake and exhaust valve of each outer cylinder including first and second cams having non-zero lift profiles and a third cam having a zero lift profile; and
cam towers flanking each cylinder, where a distance between the cam towers flanking each outer cylinder is greater than a distance between the cam towers flanking each inner cylinder;
wherein the intake and exhaust valves of the outer cylinders are operated with the third cams when torque demand is less than a threshold; and
wherein the inner cylinders are configured such that they cannot be deactivated.

2. The engine bank of claim 1, wherein the engine is a 4-cylinder inline engine.

3. The engine bank of claim 1, wherein the cam towers include exterior cam towers above the outer cylinders, the exterior cam towers extending beyond a cylinder head of the engine bank.

4. The engine bank of claim 1, wherein the cam towers include cam towers flanking both one of the outer cylinders and one of the inner cylinders, wherein a center of each cam tower which flanks both one of the outer cylinders and one of the inner cylinders is offset from a midpoint between the inner and outer cylinders it flanks in a direction towards the inner cylinder.

5. The engine bank of claim 1, wherein a first cam of the cams of each of the intake and exhaust camshafts corresponding to each inner cylinder has a high lift profile and a second cam of the cams of each of the intake and exhaust camshafts corresponding to each inner cylinder has a low lift profile.

6. The engine bank of claim 1, wherein a first cam of the cams of each of the intake and exhaust camshafts corresponding to each outer cylinder has a high lift profile, a second cam of the cams of each of the intake and exhaust camshafts corresponding to each outer cylinder has a low lift profile.

7. The engine bank of claim 1, wherein each cylinder includes two intake valves and two exhaust valves, the intake camshaft positioned above the intake valves of the cylinders and the exhaust camshaft positioned above the exhaust valves of the cylinders.

8. The engine bank of claim 1, wherein the cams of the intake and exhaust camshafts are cam lobes slidably attached to the camshaft.

9. A method of controlling an overhead camshaft having a plurality of cams, the camshaft coupled to an inline engine with inner cylinders and outer cylinders, comprising:
in response to a first condition, operating valves of the inner and outer cylinders with cams of the plurality of cams each having a first non-zero lift profile;
in response to a second condition, operating the valves of the inner and outer cylinders with cams of the plurality of cams each having a second non-zero lift profile; and
in response to a third condition where a torque demand is less than a threshold, operating the valves of the inner cylinders with cams of the plurality of cams each having the second non-zero lift profile and operating the valves of the outer cylinders with cams of the plurality of cams each having a zero lift profile;
wherein the valves of the inner cylinders are not operable with the cams having a zero lift profile such that the inner cylinders are configured such that they cannot be deactivated.

10. The method of claim 9, wherein the third condition is a variable displacement engine operating mode.

11. The method of claim 9, wherein the first condition is a high load and/or high speed engine operation and the second condition is a low load and/or low speed engine operation.

12. The method of claim 9, wherein the first non-zero lift profile is a high lift profile and the second non-zero lift profile is a low lift profile.

13. An engine, comprising:
a camshaft having a plurality of cams including cams corresponding to inner engine cylinders and cams corresponding to outer engine cylinders, the cams corresponding to the outer cylinders having exactly two discrete lift profiles and the cams corresponding to the inner cylinders having exactly three discrete lift profiles, one of the exactly three discrete lift profiles being a zero lift profile, wherein the inner cylinders have wider cam tower placement as compared to the outer cylinders;

wherein a width of a cam tower adjacent to at least one of the inner cylinders is less than a width of a cam tower adjacent to one of the outer cylinders;

wherein intake and exhaust valves of the inner cylinders are operated with the cams which have the zero lift profile when torque demand is less than a threshold; and wherein the outer cylinders are configured such that they cannot be deactivated.

* * * * *